(12) United States Patent
Chimitt et al.

(10) Patent No.: US 7,899,128 B2
(45) Date of Patent: Mar. 1, 2011

(54) MULTIPLE-OUTPUT TRANSMITTER FOR TRANSMITTING A PLURALITY OF SPATIAL STREAMS

(75) Inventors: William J. Chimitt, Folsom, CA (US); Stanley K. Ling, Rocklin, CA (US); Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/506,049

(22) Filed: Jul. 20, 2009

(65) Prior Publication Data

US 2009/0279629 A1      Nov. 12, 2009

Related U.S. Application Data

(63) Continuation of application No. 10/990,026, filed on Nov. 16, 2004, now Pat. No. 7,570,698.

(51) Int. Cl.
*H04L 23/02*  (2006.01)
(52) U.S. Cl. ......... 375/261; 375/260; 375/267; 375/299; 375/347; 455/101; 455/132; 455/296; 455/500; 370/334
(58) Field of Classification Search .................. 375/260, 375/295, 299, 347; 455/101, 132, 296, 500
See application file for complete search history.

(56) References Cited

U.S. PATENT DOCUMENTS

| 6,304,581 | B1 | 10/2001 | Chen et al. |
| 6,345,377 | B1 | 2/2002 | Kroeger et al. |
| 6,476,734 | B2 | 11/2002 | Jeong et al. |
| 6,690,736 | B1 | 2/2004 | Andre |
| 6,904,077 | B2 | 6/2005 | Toskala et al. |
| 7,145,956 | B2 | 12/2006 | Koifman |
| 7,529,307 | B2 | 5/2009 | Sandhu et al. |
| 7,570,697 | B2 * | 8/2009 | van Nee ......................... 375/260 |

(Continued)

FOREIGN PATENT DOCUMENTS

WO    WO-2006071376 A2    7/2006

(Continued)

OTHER PUBLICATIONS

"U.S. Appl. No. 10/990,026 Response filed Jan. 7, 2009 to Non-Final Office Action mailed Oct. 15, 2008", 13 pgs.

(Continued)

*Primary Examiner* — David C Payne
*Assistant Examiner* — Leon Flores
(74) *Attorney, Agent, or Firm* — Schwegman, Lundberg & Woessner, P.A.; Gregory J. Gorrie (57) ABSTRACT

A multiple output transmitter is configured for transmitting a single input data stream over two or more spatial channels using OFDM signals. The transmitter includes a commutator to select bits from the single input data stream for two or more bit streams and two or more encoders each to encode bits of one of the bit streams. The commutator operates at a bit rate and sequentially provides the selected bits of the input data stream to the encoders. A spatial bit sequencer selects groups of encoded bits from each of the encoders and assigns individual bits of a selected group at the bit-rate to block permuters in a sequential manner to distribute bits from the selected group across the block permuters. The block permuters produce interleaved blocks of bits for an associated spatial stream. The commutator assigns bits of the input bit stream to more than one encoder to allow each encoder to operate at a lower rate.

15 Claims, 5 Drawing Sheets

U.S. PATENT DOCUMENTS

| | | | |
|---|---|---|---|
| 7,570,698 | B2 | 8/2009 | Chimitt et al. |
| 2001/0031016 | A1 | 10/2001 | Seagraves |
| 2003/0063685 | A1 | 4/2003 | Yoshida |
| 2003/0072353 | A1 | 4/2003 | Wengerter et al. |
| 2004/0017860 | A1 | 1/2004 | Liu |
| 2004/0184398 | A1 | 9/2004 | Walton et al. |
| 2004/0202257 | A1 | 10/2004 | Mehta et al. |
| 2005/0152327 | A1 | 7/2005 | Erlich |
| 2005/0157639 | A1 | 7/2005 | Song et al. |
| 2005/0159115 | A1 | 7/2005 | Sandhu |
| 2006/0013181 | A1 | 1/2006 | Stolpman et al. |
| 2006/0018247 | A1* | 1/2006 | Driesen et al. ............... 370/208 |
| 2006/0034390 | A1 | 2/2006 | Vummintala et al. |
| 2006/0067411 | A1 | 3/2006 | Sandhu |
| 2006/0088115 | A1 | 4/2006 | Chen et al. |
| 2006/0104377 | A1 | 5/2006 | Chimitt et al. |
| 2006/0104379 | A1* | 5/2006 | Li et al. .......................... 375/267 |
| 2006/0156087 | A1 | 7/2006 | Lin et al. |
| 2006/0203779 | A1 | 9/2006 | Attar et al. |
| 2006/0242475 | A1 | 10/2006 | Sandhu et al. |
| 2006/0274687 | A1 | 12/2006 | Kim |
| 2007/0025317 | A1 | 2/2007 | Bolinth et al. |
| 2007/0211810 | A1 | 9/2007 | Bohnke et al. |

FOREIGN PATENT DOCUMENTS

| | | |
|---|---|---|
| WO | WO-2006076193 A1 | 7/2006 |
| WO | WO-2006071376 A3 | 8/2006 |
| WO | WO-2006071376 C2 | 8/2006 |

OTHER PUBLICATIONS

"U.S. Appl. No. 10/990,026 Response filed Jun. 2, 2008 to Non-Final Office Action mailed Mar. 18, 2008", 13 pgs.

"U.S. Appl. No. 10/990,026 Non-Final Office Action mailed Mar. 18, 2008", 18 pgs.

"U.S. Appl. No. 10/990,026, Non-Final Office Action mailed Oct. 15, 2008", 18pgs.

"U.S. Appl. No. 10/990,026, Notice of Allowance mailed Apr. 3, 2009", 9 pgs.

"U.S. Appl. No. 11/034,204 Response filed Feb. 13, 2009 to Non-Final Office Action mailed Nov. 20, 2008", 12 pgs.

"U.S. Appl. No. 11/034,204 Response filed Sep. 29, 2008 to Final Office Action mailed Jul. 24, 2008", 13 pgs.

"U.S. Appl. No. 11/034,204 Response filed Mar. 25, 2008 to Non-Final Office Action mailed Feb. 13, 2008", 17 pgs.

"U.S. Appl. No. 11/034,204 Non-Final Office Action mailed on Nov. 20, 2008", 16 pgs.

"U.S. Appl. No. 11/034,204 Non-Final Office Action mailed Feb. 13, 2008", 13 pgs.

"U.S. Appl. No. 11/093,743 Response filed Sep. 8, 2008 to Non-Final Office Action mailed Jun. 24, 2008", 8 pgs.

"U.S. Appl. No. 11/093,743 Notice of Allowance mailed Dec. 22, 2008", 11 pgs.

"U.S. Appl. No. 11/093,743 Non-Final Office Action mailed Jun. 24, 2008.", 11 pgs.

"U.S. Appl. No. 11/034,204 Final Office Action mailed Jul. 24, 2008", 13 pgs.

"International Preliminary Report on Patentability for corresponding PCT Application No. PCT/US2005/041200 mailed May 31, 2007", 9 pgs.

"International Search Report for corresponding PCT Application No. PCT/US2005/041200", (May 29, 2006), 4 pgs.

Bauch, G., et al., "Parameter Optimization, Interleaving and Multiple Access in OFDM with Cyclic Delay Diversity", *Vehicular Technology Conference*, 1, (2004), 505-509.

Hou, C., et al., "A Novel Method with Adaptive Multi-Service Transmission Algorithms Based on OFDM", *Proceedings of the 2002 IEEE Canadian Conference on Electrical & Computer Engineering*, 1, (May 12, 2002), 1305-1310.

Li, Q., et al., "Codebit Parsers for Adaptive Bit Loading over MIMO Channels", *2006 IEEE Radio and Wireless Symposium*, (2006), 179-182.

Salvekar, A., et al., "Multiple-Antenna Technology in WiMAX Systems", *Intel Technology Journal*, 8(3), (Aug. 20, 2004), 229-240.

Song, K., et al., "A Low Complexity Space Frequency BICM MIMO-OFDM System for Next Generation WLANs", (2003).

Song, K., et al., "A Low Complexity Space-Frequency BICM MIMO-OFDM System for Next-Generation WLANs", *IEEE Global Telecommunications Conference (GLOBECOM '03)*, vol. 2, (Dec. 1, 2003), 1059-1063.

Stauffer, E., et al., "Space-Frequency Bit-Interleaved Coded Modulation for MIMO-OFDM", *Conference Record of the Thirty-Ninth Asilomar Conference on Signals, Systems and Computers*, (Oct. 28, 2005), 1248-1252.

Wong, C.Y, et al., "Multiuser Subcarrier Allocation for OFDM Transmission using Adaptive Modulation", *Vehicular Technology Conference, 1, IEEE*, XP010342007, ISBN: 0-7803-5565-2, (May 16, 1999), 479-483.

"China Application No. 200580035490.8, Office action mailed on Aug. 7, 2009", 40 pgs.

Bauch, G., et al., "Parameter Optimization, Interleaving and Multiple Access in OFDM with Cyclic Delay Diversity," 2004. VTC, 2004-Spring, vol. 1, (May 19, 2004), 505-509.

Dammann, Armin, et al., "Comparison of Space-Time Block Coding and Cyclic Delay Diversity for a Broadband Mobile Radio Air interface," Publisher: German Aerospace Center, http://whitepapers.zdnet.co.uk/0,1000000651,260164433p,00.htm, (Aug. 22, 2003).

"Chinese Application Serial No. 200580035490.8, Office Action mailed May 17, 2010", 7 pgs.

* cited by examiner

|  | I |  |  | Q |  |
|---|---|---|---|---|---|
| 1 | 17 | 33 | 49 | 65 | 81 |
| 97 | 113 | 129 | 145 | 161 | 177 |
| 193 | 209 | 225 | 241 | 257 | 273 |
| 2 | 18 | 34 | 50 | 66 | 82 |
| 98 | 114 | 130 | 146 | 162 | 178 |
| 194 | 210 | 226 | 242 | 258 | 274 |
| 3 | 19 | 35 | 51 | 67 | 83 |
| 99 | 115 | 131 | 147 | 163 | 179 |
| 195 | 211 | 227 | 243 | 259 | 275 |
| 4 | 20 | 36 | 52 | 68 | 84 |
| 100 | 116 | 132 | 148 | 164 | 180 |
| 196 | 212 | 228 | 244 | 260 | 276 |
| 5 | 21 | 37 | 53 | 69 | 85 |
| 101 | 117 | 133 | 149 | 165 | 181 |
| 197 | 213 | 229 | 245 | 261 | 277 |
| 6 | 22 | 38 | 54 | 70 | 86 |
| 102 | 118 | 134 | 150 | 166 | 182 |
| 198 | 214 | 230 | 246 | 262 | 278 |
| 7 | 23 | 39 | 55 | 71 | 87 |
| 103 | 119 | 135 | 151 | 167 | 183 |
| 199 | 215 | 231 | 247 | 263 | 279 |
| 8 | 24 | 40 | 56 | 72 | 88 |
| 104 | 120 | 136 | 152 | 168 | 184 |
| 200 | 216 | 232 | 248 | 264 | 280 |
| 9 | 25 | 41 | 57 | 73 | 89 |
| 105 | 121 | 137 | 153 | 169 | 185 |
| 201 | 217 | 233 | 249 | 265 | 281 |
| 10 | 26 | 42 | 58 | 74 | 90 |
| 106 | 122 | 138 | 154 | 170 | 186 |
| 202 | 218 | 234 | 250 | 266 | 282 |
| 11 | 27 | 43 | 59 | 75 | 91 |
| 107 | 123 | 139 | 155 | 171 | 187 |
| 203 | 219 | 235 | 251 | 267 | 283 |
| 12 | 28 | 44 | 60 | 76 | 92 |
| 108 | 124 | 140 | 156 | 172 | 188 |
| 204 | 220 | 236 | 252 | 268 | 284 |
| 13 | 29 | 45 | 61 | 77 | 93 |
| 109 | 125 | 141 | 157 | 173 | 189 |
| 205 | 221 | 237 | 253 | 269 | 285 |
| 14 | 30 | 46 | 62 | 78 | 94 |
| 110 | 126 | 142 | 158 | 174 | 190 |
| 206 | 222 | 238 | 254 | 270 | 286 |
| 15 | 31 | 47 | 63 | 79 | 95 |
| 111 | 127 | 143 | 159 | 175 | 191 |
| 207 | 223 | 239 | 255 | 271 | 287 |
| 16 | 32 | 48 | 64 | 80 | 96 |
| 112 | 128 | 144 | 160 | 176 | 192 |
| 208 | 224 | 240 | 256 | 272 | 288 |

| 504 | I | | | Q | | | | | | |
|---|---|---|---|---|---|---|---|---|---|---|
| 1001 | 1017 | 1033 | 1049 | 1055 | 1081 | 1177 | 1273 | | | |
| 1097 | 1113 | 1129 | 1145 | 1161 | | | | | | |
| 1193 | 1209 | 1225 | 1241 | 1257 | | | | | | |
| 2001 | 2017 | 2033 | 2049 | 2065 | 2081 | 2177 | 2273 | | | |
| 2097 | 2113 | 2129 | 2145 | 2161 | | | | | | |
| 2193 | 2209 | 2225 | 2241 | 2257 | | | | | | |
| 3001 | 3017 | 3033 | 3049 | 3065 | 3081 | 3177 | 3273 | | | |
| 3097 | 3113 | 3129 | 3145 | 3161 | | | | | | |
| 3193 | 3209 | 3225 | 3241 | 3257 | | | | | | |
| 4001 | 4017 | 4033 | 4049 | 4065 | 4081 | 4177 | 4273 | | | |
| 4097 | 4113 | 4129 | 4145 | 4161 | | | | | | |
| 1005 | 1071 | 1037 | 1053 | 1068 | 1085 | | | | | |
| ... | ... | ... | ... | ... | ... | | | | | |

| 510 | 512 (I) | 514 | 516 | 518 | 520 (Q) |
|---|---|---|---|---|---|
| 2002 | 2018 | 2034 | 2050 | 2066 | 2082 |
| 2098 | 2114 | 2130 | 2146 | 2162 | 2178 |
| 2194 | 2210 | 2226 | 2242 | 2258 | 2274 |
| 3002 | 3018 | 3034 | 3050 | 3066 | 3082 |
| 3098 | 3114 | 3130 | 3146 | 3162 | 3178 |
| 3194 | 3210 | 3226 | 3242 | 3258 | 3274 |
| 4002 | 4018 | 4034 | 4050 | 4066 | 4082 |
| 4098 | 4114 | 4130 | 4146 | 4162 | 4178 |
| 4194 | 4210 | 4226 | 4242 | 4258 | 4274 |
| 1006 | 1022 | 1038 | 1054 | 1070 | 1085 |
| 1102 | 1118 | 1134 | 1150 | 1166 | 1182 |
| 1198 | 1214 | 1230 | 1246 | 1262 | 1278 |
| 2006 | 2022 | 2038 | 2054 | 2070 | 2086 |
| ... | ... | ... | ... | ... | 2182 |
| | | | | | ... |

MULTIPLE-OUTPUT TRANSMITTER FOR TRANSMITTING A PLURALITY OF SPATIAL STREAMS

RELATED APPLICATIONS

This application is a continuation of U.S. patent application Ser. No. 10/990,026, filed on Nov. 16, 2004, now issued as U.S. Pat. No. 7,570,698, which is incorporated herein by reference in its entirety.

TECHNICAL FIELD

Embodiments of the present invention pertain to electronic communications. Some embodiments pertain to the transmission of OFDM symbols over two or more spatial channels.

BACKGROUND

Many wireless communication systems employ an interleaving scheme to reduce errors in transmission. Interleaving, for example, may help reduce the number of uncorrected error bursts, especially in fading channels. Interleaving is generally performed after channel encoding and permutes bits in a regular or predetermined fashion prior to modulation and transmission. Upon reception and after demodulation, a deinterleaving process is performed to restore the original bit sequence. Some orthogonal frequency division multiplexed (OFDM) systems use coding and frequency interleaving to help overcome problems associated with transmitting data over frequency-selective (i.e., fading) channels. Interleaving may exploit this frequency diversity by spreading adjacent bits across the transmission bandwidth.

Some multicarrier transmitters transmit more than one spatial stream on the same multicarrier communication channel. Conventional interleaving schemes may not provide sufficient bit separation between the subcarriers of these spatial channels. Conventional interleaving schemes may also not provide sufficient bit separation between bit positions of symbols. Thus there are general needs for multicarrier transmitters and methods of interleaving suitable for the transmission of more than one spatial stream.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
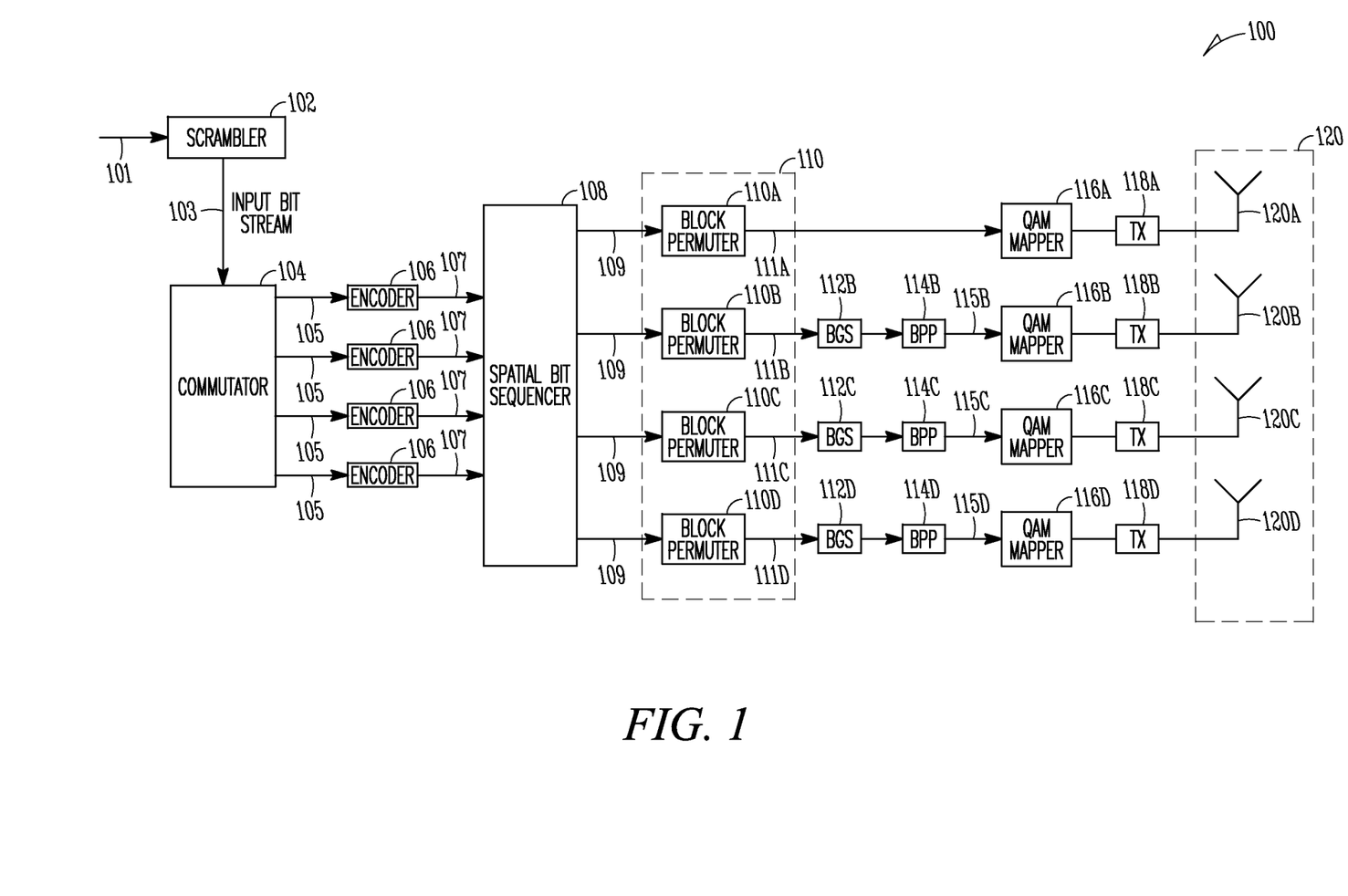
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 may transmit two or more spatial streams with antennas 120 from input bit stream 101. In some embodiments, multicarrier transmitter 100 includes scrambler 102 to scramble bits of input bit stream 101 to generate scrambled bit stream 103. In some embodiments, scrambler 102 may generate pseudo-random bits. Multicarrier transmitter 100 also includes commutator 104 to assign bits of bit stream 103 to one of a plurality of data streams 105, and encoders 106 associated with data streams 105 to receive the assigned bits from commutator 104. Encoders 106 may perform an encoding operation on the assigned bits. Multicarrier transmitter 100 also includes spatial-bit sequencer 108 to select groups of bits from each of data streams 107 to generate two or more spatial streams 109. Multicarrier transmitter 100 also includes block permuters 110 associated with each of the spatial streams to perform a block interleaving operation on bits of spatial streams 109 provided by spatial-bit sequencer 108.

In some embodiments, commutator 104 may sequentially assign bits of bit stream 103 to one of data streams 105, and spatial-bit sequencer 108 may sequentially select groups of bits from each of the data streams 107 to generate up to four or more spatial streams 109, although the scope of the invention is not limited in this respect.

Figure 2:
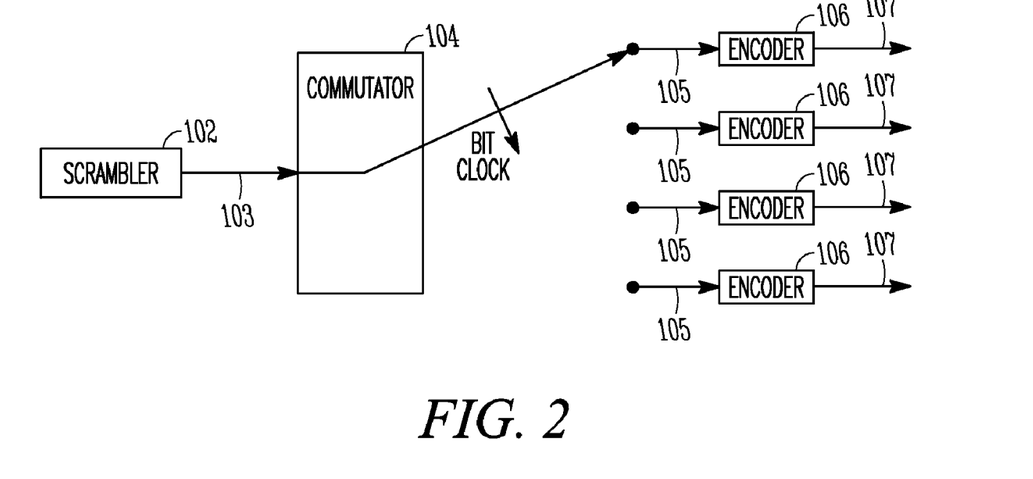
FIG. 2 illustrates the operation of a commutator in accordance with some embodiments of the present invention.

The operation of commutator 104 is illustrated in FIG. 2 in which a bit clock operating at a bit rate may select individual bits of bit stream 103 and provide each selected bit sequentially to one of encoders 106. In these example embodiments, every fourth bit may be assigned to one of encoders 106. In some embodiments, because commutator 104 may assign bits of bit stream 103 to more than one encoder 106, the rate at which an encoder may operate can be reduced. In some embodiments, encoders 106 may comprise convolutional encoders and may generate encoded bits. In some embodiments, encoders 106 may employ error-correcting techniques, although the scope of the invention is not limited in this respect. Each encoder 106 may generate encoded bits associated with a particular data stream 107. Although FIGS. 1 & 2 illustrate four encoders 106 in which each encoder is associated with one of four data streams 107, the scope of the invention is not limited in this respect.

Figure 3:
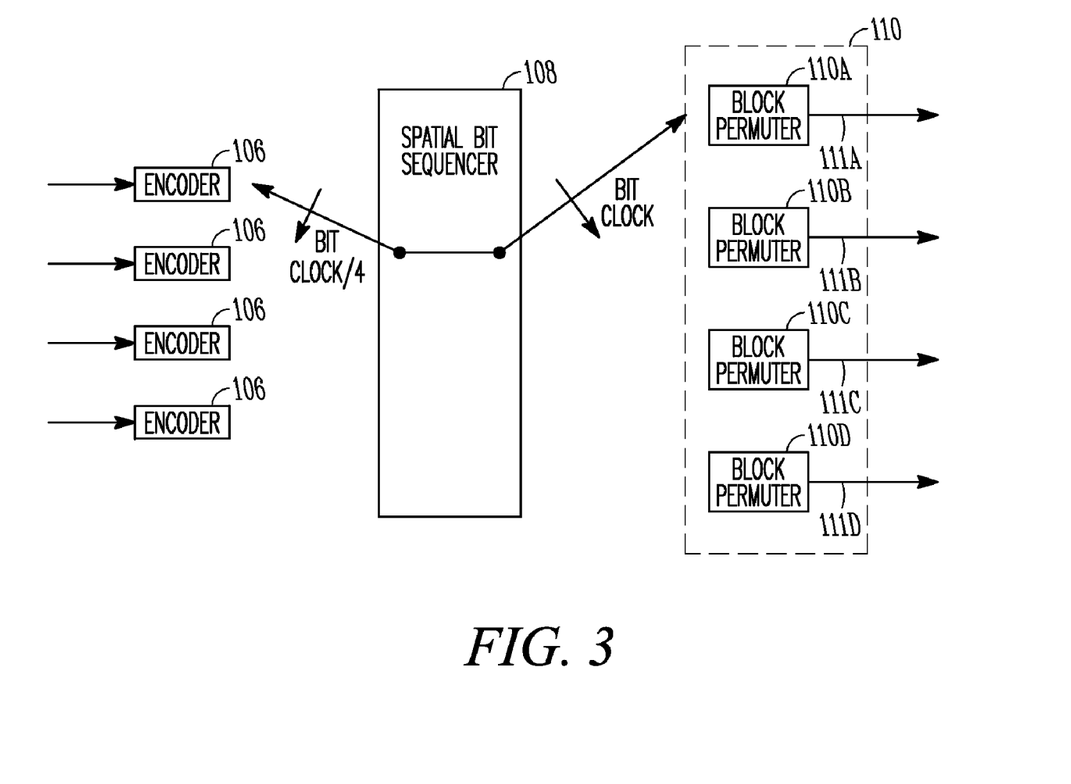
FIG. 3 illustrates the operation of a spatial-bit sequencer in accordance with some embodiments of the present invention.

In some embodiments, spatial-bit sequencer 108 may select groups of four bits from each data stream 107 to generate more than one of spatial streams 109. An example of the operation spatial-bit sequencer 108 is illustrated in FIG. 3. In FIG. 3, spatial-bit sequencer 108 may select bits from encoders 106 at ¼ the bit clock and may provide the selected bits to permuters 110 at the bit clock rate. In these example embodiments, groups of four encoded bits may be selected from each of encoders 106 and provided individually to permuters 110. For example, spatial-bit sequencer 108 may select four encoded bits from the first encoder, and may provide the first bit to first permuter 110A, the second bit to second permuter 110B, the third bit to third permuter 110C, and the fourth bit fourth permuter 110D.

Although FIGS. 1 & 3 illustrates spatial-bit sequencer 108 receiving four data streams 107 and generating four spatial streams 109, some embodiments of the present invention do not require such a one-to-one correspondence between data streams 107 and spatial streams 109. In some embodiments, the number of data streams 107 may differ from the number of spatial streams 109.

Referring to FIG. 1, multicarrier transmitter 100 also includes one or more bit-grouping shifters (BGS) 112B-112D to shift symbol-bit groupings of an associated spatial stream (e.g., spatial streams 111B-111D) among subcarriers of a multicarrier communication signal. Multicarrier transmitter 100 also includes one or more bit-position permuters (BPP) 114B-114D to rotate bits among bit positions within subgroupings of the symbol-bit groupings of an associated spatial stream. The operations of bit-grouping shifters 112B-112D and bit-position permuters 114B-114D are described in more detail below.

Multicarrier transmitter 100 also includes mappers 116A-116D associated with a spatial stream to map bits from within bit positions to symbols. Mappers 116A-116D may also symbol-modulate the mapped symbol-bit groupings and may generate symbol-modulated subcarriers 117A-117D associated with a spatial stream. Multicarrier transmitter 100 also includes transmission (TX) circuitry 118A-118D associated with each spatial stream. Each spatial stream may be transmitted by one of a plurality of transmit antennas 120. In these embodiments, one antenna may be used to transmit an associated spatial stream. In some embodiments, the number of antennas may be at least as great as the number of spatial streams being transmitted. In some embodiments, transmitter 100 may further comprise a beamformer (not separately illustrated) to operate on symbol-modulated subcarriers representing the spatial streams to generate combined signals for transmission by transmit antennas 120.

Transmission circuitry 118A-118D may include, among other things, inverse fast Fourier transformation (IFFT) circuitry to generate time-domain samples from the frequency domain samples comprising symbol-modulated subcarriers 117A-117D. Transmission circuitry 118A-118D may also include analog-to-digital conversion circuitry to generate analog I and Q signals, and radio-frequency (RF) circuitry to generate RF signals for transmission by an associated one of antennas 120.

Figure 4:
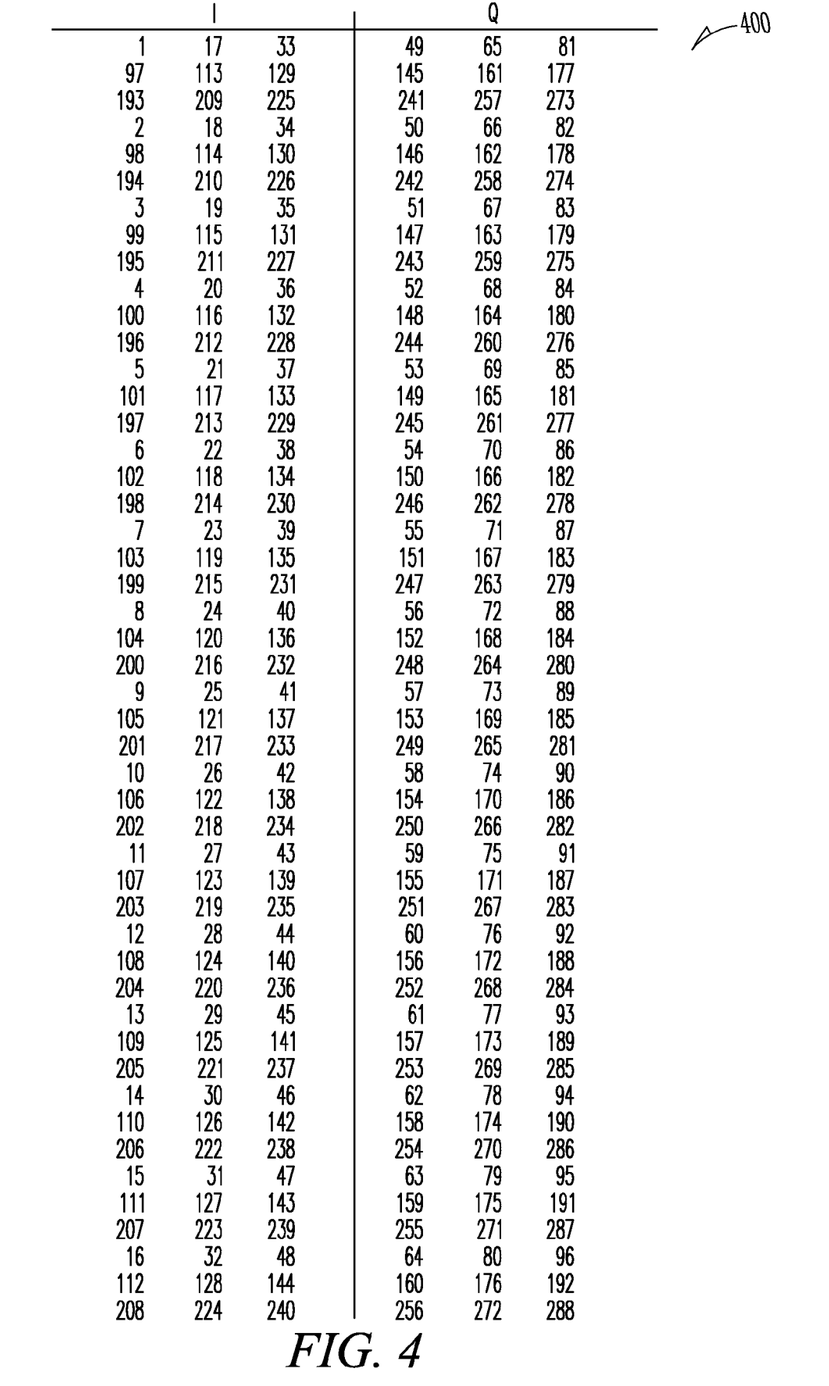
FIG. 4 illustrates an example output of a block permuter in accordance with some embodiments of the present invention.

FIG. 4 illustrates example output 400 of one of block permuters 110 (FIG. 1). This example illustrates a modulation level of 64-QAM in six bits comprise each symbol (i.e., three I bits and three Q-bits). The assigned subcarriers of the multicarrier communication channel correspond to the different rows. In FIG. 4, the numbers in the table refer to a sequence number of the bits of a bit sequence received at the input of one of block permuters 110 (FIG. 1). At the output of one of block permuters 110 (FIG. 1), bits may be provided by row in the order illustrated. In some embodiments, block permuters 110 (FIG. 1) may perform a block interleaving operation in accordance with the IEEE 802.11a standard referenced below, although the scope of the invention is not limited in this respect. Other block permuting operations are also suitable for use by block permuters 110 (FIG. 1). As illustrated in the example of FIG. 4, sequential bits at the input of one of permuters 110 (FIG. 1) are separated by three subcarriers which result from a block permutation, although the scope of the invention is not limited in this respect.

Figure 5A:
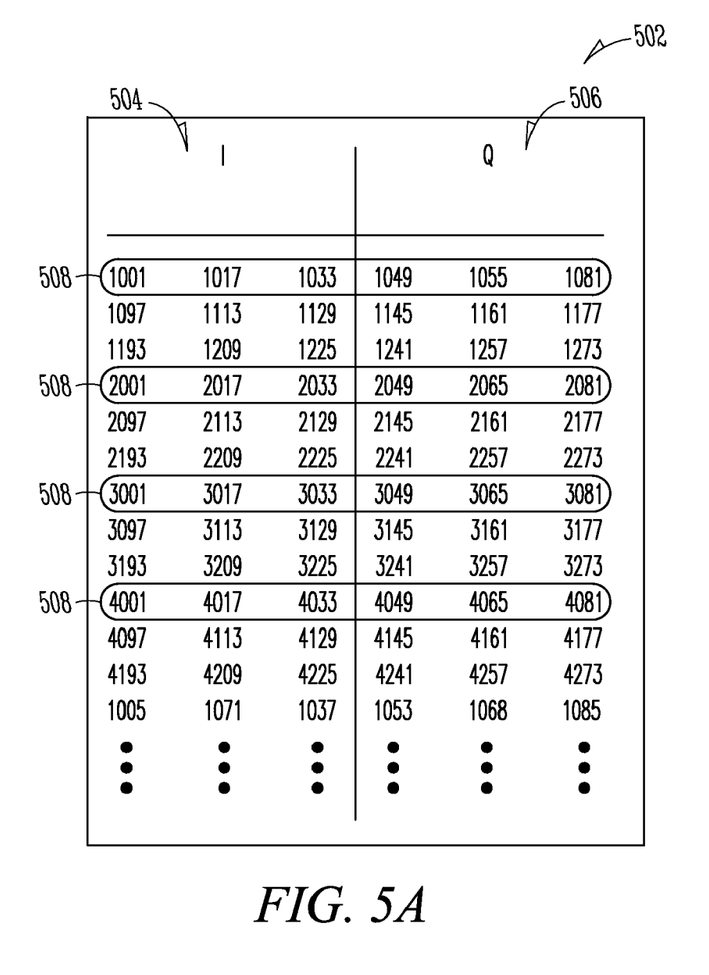
FIGS. 5A and 5B illustrate the operations of bit-grouping shifters and bit-position permuters in accordance with some embodiments of the present invention.
Figure 5B:
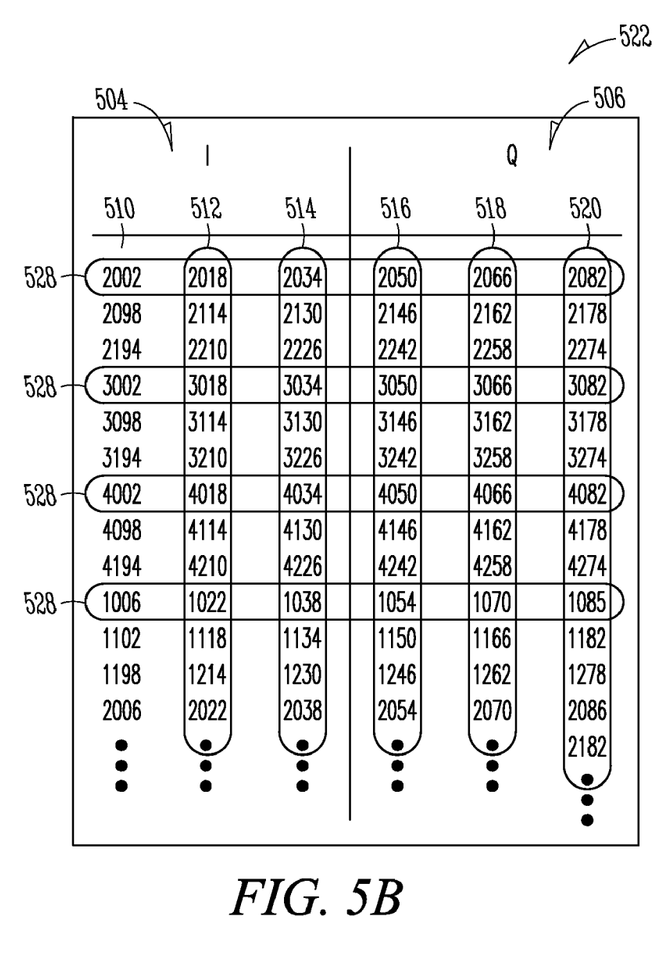

FIGS. 5A and 5B illustrate the operations of bit-grouping shifters and bit-position permuters in accordance with some embodiments of the present invention. FIG. 5A illustrates bits of first spatial stream 502 and FIG. 5B illustrates bits of second spatial stream 522. The values of the numbers in FIGS. 5A and 5B correspond to sequential bits from each of encoders 106 (FIG. 1) where the first digit corresponds to the decoder number. In this example, bits from four decoders are illustrated. In this example, bit "1001" is a first bit provided by a first of the decoders, and bit "4097" is a ninety seventh bit provided by the fourth of the decoders.

Each spatial stream 202 and 222 may comprise symbol-bit groupings 508 or 528 which comprise in-phase (I) subgroupings 504 and quadrature-phase (Q) subgroupings 506. First spatial stream 502 may correspond to first spatial stream 111A (FIG. 1) and second spatial stream 522 may refer to second spatial stream 111B (FIG. 1). In FIGS. 5A and 5B, each row of bits may be associated with a subcarrier frequency (e.g., tone) of a multicarrier communication signal. For clarity, only a few of symbol-bit groupings 508 are 528 are circled. Third spatial stream 111C (FIG. 1) and fourth spatial stream 111D (FIG. 1) may be similar.

Referring to FIGS. 1, 5A and 5B together, in some embodiments, multicarrier transmitter 100 may use two or more antennas 120 for transmitting at least first and second spatial streams 111A & 111B. In these embodiments, first bit-grouping shifter 112B may shift symbol-bit groupings 528 of second spatial stream 522 among the subcarriers of the multicarrier communication signal. In these embodiments, bit-position permuter 114B may rotate bits among bit positions 510-514 within I subgrouping 504 and may rotate bits among bit positions 516-520 within Q subgrouping 506 of second spatial stream 522 to generate output bit stream 115B.

In some embodiments, symbol-bit groupings 528 may be quadrature-amplitude-modulation (QAM) bit groupings. In some embodiments, bit-position permuter 114B circularly rotates bits among positions within I subgroupings 504 and within Q subgroupings 506.

In some embodiments, the QAM bit groupings may have a predetermined number of bits associated therewith. The predetermined number of bits per QAM bit grouping may range from two-bits per symbol (BPSK) or four bits per symbol (16-QAM) to eight or more bits per symbol (256-QAM). In some embodiments, the QAM bit groupings may have a predetermined number of bits. FIGS. 5A and 5B illustrate a modulation level of 64-QAM, which communicates six bits per symbol, although the scope of the invention is not limited in this respect. Modulation levels with lower and higher data communication rates per subcarrier may also be used.

In some embodiments, the number of subcarriers that bit-grouping shifters 112B-112D shifts the QAM bit groupings may be based on a spatial stream index. The spatial stream index may be different for each spatial stream. For example, first spatial stream 111A may have an index of zero, the second spatial stream 111B may have an index of 1, third spatial stream 111C may have an index of two, and fourth spatial stream 111D may have an index of three. The spatial stream index may be used by bit-grouping shifters 112B-112D and bit-position permuters 114B-114D to provide differing amounts of bit shifting and bit position rotating for each spatial stream as described below. In some embodiments, the spatial stream index may be arbitrarily assigned.

The number of bit positions within I subgroupings 504 and within Q subgroupings 506 of QAM symbol-bit groupings 528 that the bits are circularly rotated by bit-position permuters 114B-114D may also based on the spatial stream index. Although multicarrier transmitter 100 is illustrated as having bit-grouping shifters 112B-112D in a signal processing path prior to bit-position permuters 114B-114D, in some other embodiments, the order of these operations may be interchanged.

In some embodiments, first spatial stream 111A may have an index of zero and therefore the QAM bit groupings are not shifted by a bit-grouping shifter and bits are not rotated among bit positions within I and Q subgroupings by a bit-position permuter. In these embodiments, second spatial stream 111B may have an index of one and therefore the QAM bit groupings may be shifted by three subcarriers (e.g., three times the index) by bit-grouping shifter 112B, and the bits within the I subgroupings 504 and within Q subgroupings 506 may be rotated by one bit position (e.g., one times the index) by bit-position permuter 114B. In these embodiments, third spatial stream 111C may have an index of two and therefore the QAM bit groupings may be shifted by six subcarriers (e.g., three times the index) by bit-grouping shifter 112C, and the bits within the I subgroupings and within the Q subgroupings may be rotated by two bit positions (e.g., one times the index) by bit-position permuter 114C. In these embodiments, fourth spatial stream 111D may have an index of three and therefore the QAM bit groupings may be shifted by nine subcarriers (e.g., three times the index) by bit-grouping shifter 112D, and the bits within the I subgroupings and within Q subgroupings may be rotated by three bit positions (e.g., one times the index) by bit-position permuter 114D. In this way, QAM symbol shifting and bit-position rotation may be performed on all spatial streams but one (e.g., the first one).

Although FIG. 5 illustrates an example for 64-QAM with four spatial streams in which the QAM groupings are shifted a number of subcarriers based on a factor of three times the spatial stream index, the scope of the invention is not limited in this respect. Different amounts of shifting may be performed depending on the type of permuting performed by block permuters 110 to help provide a maximal subcarrier separation between adjacent bit and near adjacent bits at the output of the bit-grouping shifters.

In some embodiments, first bit-position permuter 114B may circularly rotate bits among bit-positions with I subgroupings and within Q subgroupings of each of QAM bit groupings 528. Each of QAM bit groupings 528 may be associated with one subcarrier of the multicarrier communication signal, and first bit-grouping shifter 112B shifts QAM bit groupings 528 by a plurality of subcarriers of the multicarrier communication signal.

In some embodiments, bit-position permuter 114B may rotate bits of I subgroupings 504 in columns 510, 512 and 514 left by one column (i.e., one bit position) so that bits originally in column 510 reside in column 514, bits originally in column 512 reside in column 510, and bits originally in column 514 now reside in column 512. Similarly bit-position permuter 114B may rotate bits of Q subgroupings 506 in columns 516, 518 and 512 left by one column (i.e., one bit position) so that bits originally in column 516 reside in column 520, bits originally in column 518 reside in column 516, and bits originally in column 520 now reside in column 516. The shift may be performed in either direction. In the case of a three bit position shift, the bits result in their original position because there are three bits per I or Q subgrouping as illustrated, however, the scope of the invention is not limited in this respect. In some other embodiments, the I and Q subgroupings may comprise a higher number of bits per symbol grouping.

In some embodiments, first QAM mapper 116A may include a first symbol modulator to symbol-modulate QAM symbol-bit groupings of first spatial stream 111A to generate a first plurality of symbol-modulated subcarriers 117A. Second QAM mapper 116B may include a second symbol modulator to symbol-modulate the QAM symbol-bit groupings of the second spatial stream 115B after operation of first bit-grouping shifter 112B and first bit-position permuter 114B to generate a second plurality of symbol-modulated subcarriers 117B. The first plurality of symbol-modulated subcarriers 117A may comprise a first orthogonal frequency division multiplexed (OFDM) symbol for subsequent transmission by first antenna 120A, and the second plurality of symbol-modulated subcarriers 117B may comprise a second OFDM symbol for subsequent transmission by second antenna 120B.

In some embodiments, first block permuter 110A may perform a block interleaving operation on bits 109 associated with the first spatial stream. Second block permuter 110B may perform the block interleaving operation on bits associated with the second spatial stream prior operation of bit-grouping shifter 112B and bit-position permuter 114B.

In some embodiments, first bit-grouping shifter 112B may shift each symbol-bit grouping 528 of second spatial stream 522 by a predetermined number of subcarriers based on a spatial stream index of the second spatial stream, and first bit-position permuter 114B may rotate bits within the I subgroupings and within the Q subgroupings of symbol-bit groupings 528 of second spatial stream 522 by a predetermined number of bit positions for all of the subcarriers of the multicarrier communication signal. The predetermined number bit positions may be based on the spatial stream index of the second spatial stream. In some embodiments, first bit-grouping shifter 112B may shift each symbol-bit grouping 528 of second spatial stream 522 by three subcarriers, and first bit-position permuter 114B may rotate bits within I subgroupings 504 and within Q subgroupings 506 of the symbol-bit groupings 528 of second spatial stream 522 by one bit position, although the scope of the invention is not limited in this respect.

In some embodiments that transmit more than two spatial streams, multicarrier transmitter 100 also comprises second bit-grouping shifter 112C to shift symbol-bit groupings of third spatial stream 111C by a predetermined number of subcarriers based on a spatial stream index of third spatial stream 111C. Multicarrier transmitter 100 may also include second bit-position permuter 114C to rotate bits within the I subgroupings and within the Q subgroupings of the symbol-bit groupings of third spatial stream 111C by a predetermined number of bit-positions for all of the subcarriers of the multicarrier communication signal. The predetermined number of bit positions may be based on the spatial stream index of third spatial stream 111C. In these embodiments, multicarrier transmitter 100 may also include third QAM mapper 116C to symbol-modulate the symbol-bit groupings of third spatial stream 115C after operation of second bit-grouping shifter 112C and second bit-position permuter 114C to generate a third plurality of symbol-modulated subcarriers 117C. The third plurality of symbol-modulated subcarriers 117C may comprise a third orthogonal frequency division multiplexed symbol for subsequent transmission by third antenna 120C.

In some embodiments, second bit-grouping shifter 112C shifts each QAM symbol-bit grouping of third spatial stream 111C by six subcarriers. In these embodiments, second bit-position permuter 114C may rotate bits within the I subgroupings and within the Q subgroupings of the QAM symbol-bit groupings of third spatial stream 111C by two bit positions, although the scope of the invention is not limited in this respect.

In some embodiments that transmit more than three spatial streams, multicarrier transmitter 100 may also comprise third bit-grouping shifter 112D to shift QAM symbol-bit groupings of fourth spatial stream 111D by a predetermined number of subcarriers based on a spatial stream index of fourth spatial stream 111D. Multicarrier transmitter 100 may also include third bit-position permuter 114D to rotate bits within the I subgroupings and within the Q subgroupings of the QAM symbol-bit groupings of fourth spatial stream 111D by a predetermined number of bit-positions for all of the subcarriers of the multicarrier communication signal. The predetermined number may be based on the spatial stream index of fourth spatial stream 111D. In these embodiments, multicarrier transmitter 100 may include symbol mapper 116D to symbol-modulate the QAM symbol-bit groupings of fourth spatial stream 115D after operations of third bit-grouping shifter 112D and third bit-position permuter 114D to generate a fourth plurality of symbol-modulated subcarriers 117D. The fourth plurality of symbol-modulated subcarriers 117D may comprise a fourth OFDM symbol for subsequent transmission by fourth antenna 120D. In some of these embodiments, third bit-grouping shifter 112D may shift each QAM symbol-bit grouping of fourth spatial stream 111D by nine subcarriers, and third bit-position permuter 114D may rotate bits within the I subgroupings and within the Q subgroupings of the QAM symbol-bit groupings of fourth spatial stream 111C by three bit positions, although the scope of the invention is not limited in this respect.

In some embodiments, multicarrier transmitter 100 generates a multicarrier symbol for each of the spatial streams. Each multicarrier symbol may comprise a plurality of symbol-modulated subcarriers of a multicarrier communication signal. In some embodiments, each antenna may transmit an OFDM symbol on the same frequency subcarriers as the other antennas. In these embodiments, antenna diversity is employed to allow the transmission of additional data (e.g., more than one spatial stream) without an increase in frequency bandwidth.

Although multicarrier transmitter 100 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, some functional elements of multicarrier transmitter 100 may refer to one or more processes operating on one or more processing elements.

In some embodiments, multicarrier transmitter 100 may transmit an OFDM packet on a multicarrier communication channel. The multicarrier communication channel may be within a predetermined frequency spectrum. The multicarrier communication channel may comprise a plurality of orthogonal subcarriers. In some embodiments, the orthogonal subcarriers of a multicarrier communication channel may be closely spaced OFDM subcarriers. To achieve orthogonality between closely spaced subcarriers, in some embodiments, the subcarriers of a particular multicarrier communication channel may have a null at substantially a center frequency of the other subcarriers of that channel.

In some embodiments, multicarrier transmitter 100 may communicate with one or more other communication stations over an OFDM communication channel. In some embodiments, the OFDM communication channel may comprise one or more spatial channels associated with each subchannel. In some embodiments, spatial channels associated with a particular multicarrier channel may overlap in frequency (i.e., use the same subcarriers) and orthogonality may be achieved through beamforming and/or antenna diversity.

In some embodiments, the frequency spectrums for a multicarrier communication channel may comprise either a 5 GHz frequency spectrum or a 2.4 GHz frequency spectrum, although the scope of the invention is not limited in this respect. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are equally suitable.

In some embodiments, multicarrier transmitter 100 may be part of a wireless communication device. The wireless communication device may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multicarrier transmitter 100 may transmit and/or receive RF communications in accordance with specific communication standards, such as the Institute of Electrical and Electronics Engineers (IEEE) standards including IEEE 802.11(a), 802.11(g/h) and/or 802.11(n) standards for wireless local area networks (WLANs) and/or 802.16 standards for wireless metropolitan area networks (WMANs), although multicarrier transmitter 100 may also be suitable to transmit and/or receive communications in accordance with other techniques.

Each of antennas 120 may be a directional or omnidirectional antenna, including, for example, a dipole antenna, a monopole antenna, a patch antenna, a loop antenna, a microstrip antenna or other type of antenna suitable for transmission of multicarrier signals.

Figure 6:
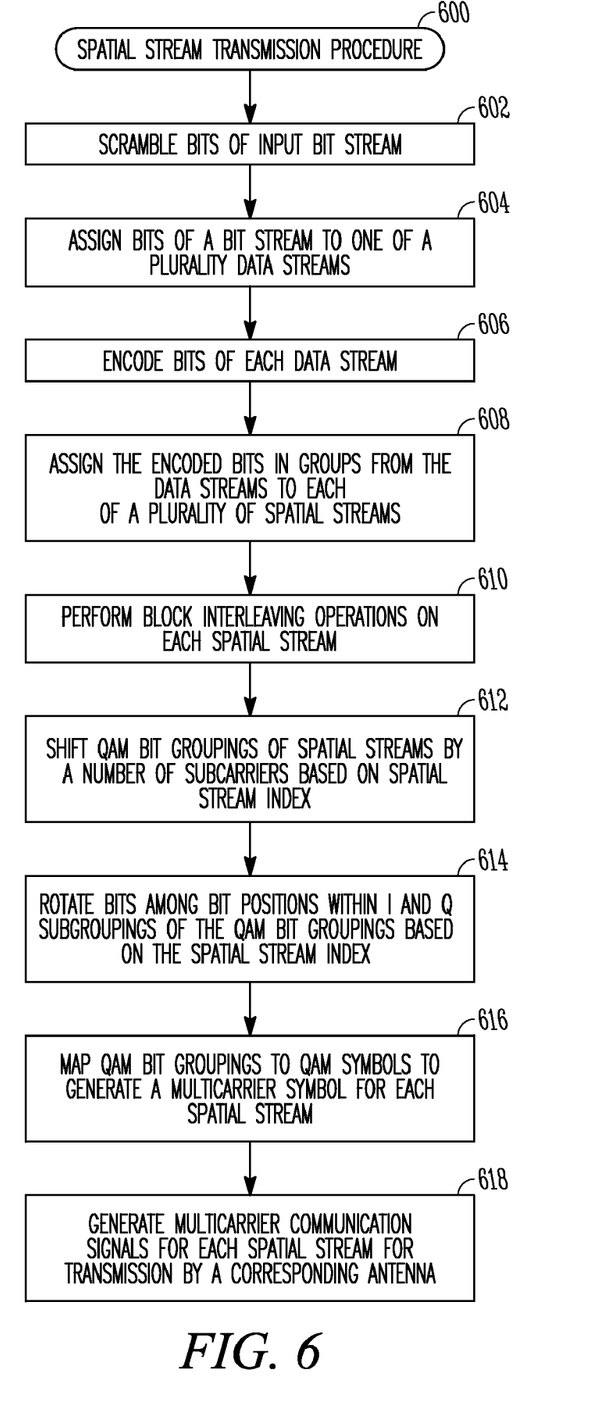
FIG. 6 is a flow chart of a spatial stream transmission procedure in accordance with some embodiments of the present invention.

FIG. 6 is a flow chart of a spatial stream transmission procedure in accordance with some embodiments of the present invention. Procedure 600 may be performed by a multicarrier transmitter, such as multicarrier transmitter 100 (FIG. 1), although other multicarrier and OFDM transmitters may also be suitable.

Operation 602 scrambles bits of an input bit stream. Operation 602 may be performed by scrambler 102 (FIG. 1), although the scope of the invention is not limited in this respect.

Operation 604 assigns bits of the bit stream to one of a plurality of data streams. Operation 604 may be performed by commutator 104 (FIG. 1), although the scope of the invention is not limited in this respect.

Operation 606 separately encodes bits of each data stream. Operation 606 may be performed by encoders 106 (FIG. 1), although the scope of the invention is not limited in this respect.

Operation 608 assigns the encoded bits in groups from the data streams to each of a plurality of spatial streams. Operation 608 may be performed by spatial-bit sequencer 108 (FIG. 1), although the scope of the invention is not limited in this respect.

Operation 610 separately performs block interleaving operations on blocks of bits of each of the spatial streams. Operation 610 may be performed by block permuters 110A-111D (FIG. 1), although the scope of the invention is not limited in this respect.

Operation 612 shifts QAM bit groupings by a number of subcarriers based on the spatial stream index associated with the spatial stream. Operation 612 may be performed by bit-grouping shifters 112B-112D (FIG. 1) for some of the spatial streams, although the scope of the invention is not limited in this respect.

Operation 614 rotates bits among bit positions of I and Q subgroupings of the QAM symbol-bit groupings based on the spatial stream index associated with the spatial stream. Operation 614 may be performed by bit-position permuters 114B-114D (FIG. 1) for some of the spatial streams, although the scope of the invention is not limited in this respect.

Operation 616 maps the QAM bit groupings to QAM symbols to generate a multicarrier symbol for reach spatial stream. Operation 616 may be performed by QAM mappers 116A-116D (FIG. 1) for each spatial stream, although the scope of the invention is not limited in this respect.

Operation 618 generates multicarrier communication signals for each spatial stream for transmission by a corresponding antenna. Operation 618 may be performed by transmit circuitry 118A-118D (FIG. 1), although the scope of the invention is not limited in this respect.

Although the individual operations of procedure 600 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A transmitter configured for transmitting a single input data stream over two or more spatial channels using orthogonal frequency division multiplexed (OFDM) signals, the transmitter comprising:
   a commutator to select bits from the single input data stream for two or more bit streams;
   two or more encoders, each to encode bits of one of the bit streams, wherein the commutator operates at a bit rate and sequentially provide the selected bits of the input data stream to the encoders;
   a block permuter associated with each spatial stream; and
   a spatial bit sequencer having a plurality of inputs and a plurality of outputs, each input coupled to an output of one of the encoders and each output coupled to an input of one of the block permuters,
   the spatial bit sequencer to select groups of encoded bits from each of the encoders and to assign individual bits of a selected group at the bit-rate to each of the block permuters in a sequential manner to distribute bits from the selected group across the block permuters, the block permuters to perform a block interleaving operation on blocks of bits of an associated spatial stream to produce interleaved blocks of bits for the associated spatial streams.

2. The transmitter of claim 1 wherein the commutator assigns bits of the input bit stream to more than one encoder to allow each encoder to operate at a lower rate.

3. The transmitter of claim 2 further comprising; a QAM mapper for each spatial stream to map bits of the spatial streams to QAM symbols for subsequent transmission; and tranmission circuitry to transmit the QAM symbols for each of the spatial streams over an associated spatial channel.

4. A transmitter configured for transmitting a single input data stream over two or more spatial channels using orthogonal frequency division multiplexed (OFDM) signals, the transmitter comprising:
   a commutator to select bits from the single input data stream for two or more bit streams;
   two or more encoders, each to encode bits of one of the bit streams, wherein the commutator operates at a bit rate and sequentially provide the selected bits of the input data stream to the encoders;
   a spatial bit sequencer;
   a block permuter associated with each spatial stream, the spatial bit sequencer to select groups of encoded bits from each of the encoders and to assign individual bits of a selected group at the bit-rate to each of the block permuters in a sequential manner to distribute bits from the selected group across the block permuters, the block permuters to perform a block interleaving operation on blocks of bits of an associated spatial stream to produce interleaved blocks of bits for the associated spatial streams;
   a QAM mapper for each spatial stream to map bits of the spatial streams to QAM symbols for subsequent transmission;
   bit-grouping shifters to shift bits within symbol-bit groupings of the interleaved blocks of bits by a spatial stream index of an associated spatial stream, each spatial stream having a different spatial stream index; and
   bit-position permuters to rotate bits among I and Q subgroups of the symbol-bit groupings based on the spatial stream index,
   wherein the commutator assigns bits of the input bit stream to more than one encoder to allow each encoder to operate at a lower rate.

5. The transmitter of claim 4 wherein the spatial stream index is zero for a first spatial stream, one for a second spatial stream, two for a third spatial stream and three for a forth spatial stream.

6. The transmitter of claim 5 further comprising transmission circuitry to transmit the QAM symbols for each of the spatial streams over an associated spatial channel.

7. The transmitter of claim 6 wherein the transmitter comprises four of the encoders, four of the block permuters and four of the QAM mappers for transmitting the single input data stream over up to four of the spatial channels,
wherein the commutator select bits from the single input data stream for four bit streams, and
wherein the spatial bit sequencer operates at one-fourth the bit rate to select groups of the encoded bits from each of the four encoders.

8. A method for transmitting a single input data stream over two or more spatial channels using orthogonal frequency division multiplexed (OFDM) signals with a transmitter, the method comprising:
selecting bits from the single input data stream for two or more bit streams;
separately encoding bits of each of the bit streams wherein the bits are selected at a bit rate and sequentially provided for encoding by separate encoders;
selecting groups of encoded bits from each of the encoders and assigning individual bits of a selected group at the bit-rate to block permuters in a sequential manner to distribute bits from the selected group across the block permuters,
performing a block interleaving operation on blocks of bits of an associated spatial stream to produce interleaved blocks of bits for the associated spatial streams,
wherein the selecting groups is performed by a spatial bit sequencer having a plurality of inputs and a plurality of outputs, each input coupled to an output of one of the separate encoders and each output coupled to an input of a block permuter for performing the block interleaving operation.

9. The method of claim 8 wherein the bits of the input bit stream are assigned to more than one encoder to allow each encoder to operate at a lower rate.

10. The method of claim 9 further comprising; mapping, with a QAM mapper for each spatial stream, bits of the spatial streams to QAM symbols for subsequent transmission; and
transmitting the OAM symbols for each of the spatial streams over an associated spatial channel.

11. A method for transmitting a single input data stream over two or more spatial channels using orthogonal frequency division multiplexed (OFDM) signals with a transmitter, the method comprising:
selecting bits from the single input data stream for two or more bit streams;
separately encoding bits of each of the bit streams wherein the bits are selected at a bit rate and sequentially provided for encoding by separate encoders;
selecting groups of encoded bits from each of the encoders and assigning individual bits of a selected group at the bit-rate to block permuters in a sequential manner to distribute bits from the selected group across the block permuters;
performing a block interleaving operation on blocks of bits of an associated spatial stream to produce interleaved blocks of bits for the associated spatial streams;
mapping, with a QAM mapper for each spatial stream, bits of the spatial streams to QAM symbols for subsequent transmission;
shifting bits within symbol-bit groupings of the interleaved blocks of bits by a spatial stream index of an associated spatial stream, each spatial stream having a different spatial stream index; and
rotating bits among I and Q subgroups of the symbol-bit groupings based on the spatial stream index,
wherein the bits of the input bit stream are assigned to more than one encoder to allow each encoder to operate at a lower rate.

12. The method of claim 11 wherein the spatial stream index is zero for a first spatial stream, one for a second spatial stream, two for a third spatial stream and three for a forth spatial stream.

13. The method of claim 12 further comprising transmitting the QAM symbols for each of the spatial streams over an associated spatial channel.

14. A transmitter configured for transmitting a single input data stream over two or more spatial channels using orthogonal frequency division multiplexed (OFDM) signals, the transmitter comprising:
a block permuter associated with each spatial stream;
a spatial bit sequencer to select groups of encoded bits from each of two or more encoders and to assign individual bits of a selected group at a bit-rate to each of the block permuters in a sequential manner to distribute bits from the selected group across the block permuters, the block permuters to perform a block interleaving operation on blocks of bits of an associated spatial stream to produce interleaved blocks of bits for the associated spatial streams;
bit-grouping shifters to shift bits within symbol-bit groupings of the interleaved blocks of bits by a spatial stream index of an associated spatial stream, each spatial stream having a different spatial stream index; and
bit-position permuters to rotate bits among I and Q subgroups of the symbol-bit groupings based on the spatial stream index.

15. The transmitter of claim 14 further comprising:
a commutator to select bits from the single input data stream for two or more bit streams;
the two or more encoders, each to encode bits of one of the bit streams, wherein the commutator operates at the bit rate and sequentially provides the selected bits of the input data stream to the encoders,
wherein the commutator assigns bits of the input bit stream to more than one encoder to allow each encoder to operate at a lower rate.

* * * * *

UNITED STATES PATENT AND TRADEMARK OFFICE
CERTIFICATE OF CORRECTION

PATENT NO.        : 7,899,128 B2
APPLICATION NO.   : 12/506049
DATED             : March 1, 2011
INVENTOR(S)       : William J. Chimitt et al.

Page 1 of 1

It is certified that error appears in the above-identified patent and that said Letters Patent is hereby corrected as shown below:

In column 10, line 32, in Claim 3, delete "tranmission" and insert -- transmission --, therefor.

In column 11, line 46, in Claim 10, delete "OAM" and insert -- QAM --, therefor.

Signed and Sealed this
Tenth Day of May, 2011

David J. Kappos
*Director of the United States Patent and Trademark Office*